(12) United States Patent
Camacho

(10) Patent No.: US 9,664,221 B2
(45) Date of Patent: May 30, 2017

(54) EXPANDING DEVICES

(76) Inventor: Armando Camacho, Sydney (AU)

( * ) Notice: Subject to any disclaimer, the term of this patent is extended or adjusted under 35 U.S.C. 154(b) by 0 days.

(21) Appl. No.: 13/979,420

(22) PCT Filed: Jan. 13, 2012

(86) PCT No.: PCT/AU2012/000024
§ 371 (c)(1),
(2), (4) Date: Jul. 12, 2013

(87) PCT Pub. No.: WO2012/094709
PCT Pub. Date: Jul. 19, 2012

(65) Prior Publication Data
US 2013/0287477 A1    Oct. 31, 2013

(30) Foreign Application Priority Data
Jan. 14, 2011    (AU) ................................ 2011900108

(51) Int. Cl.
*F16B 7/10* (2006.01)
*F16D 1/12* (2006.01)
*F16B 21/00* (2006.01)
*G09F 15/00* (2006.01)
*G09F 21/04* (2006.01)

(52) U.S. Cl.
CPC .......... *F16B 21/00* (2013.01); *G09F 15/0025* (2013.01); *G09F 15/0031* (2013.01); *G09F 15/0062* (2013.01); *G09F 21/04* (2013.01); *Y10T 403/32254* (2015.01)

(58) Field of Classification Search
CPC ..... Y10T 403/32254; Y10T 403/32271; Y10T 403/604; G09F 15/0062; G09F 21/04
USPC .............. 403/83, 85, 328; 40/590, 610, 601, 40/607.04
See application file for complete search history.

(56) References Cited

U.S. PATENT DOCUMENTS

| 4,235,390 A | * | 11/1980 | Kessler .......................... 242/602 |
| 4,449,542 A | * | 5/1984 | McSwain et al. .............. 135/98 |
| 4,934,396 A | * | 6/1990 | Vitta .............................. 135/139 |
| 5,343,887 A |   | 9/1994 | Danaher |
| 5,430,980 A |   | 7/1995 | Ferrier |
| 5,544,024 A | * | 8/1996 | Wittern et al. .................. 362/89 |
| 6,199,504 B1 |  | 3/2001 | Freeman |

(Continued)

FOREIGN PATENT DOCUMENTS

| CA | 2391253 A1 | 12/2003 |
| DE | 202010015220 U1 | 1/2011 |
| WO | WO2009140740 A1 | 11/2009 |

*Primary Examiner* — Gregory Binda
*Assistant Examiner* — Nahid Amiri
(74) *Attorney, Agent, or Firm* — King & Schickli, PLLC

(57) ABSTRACT

An expandable device including: a first member; a second member; at least one tension member attached to the first and second members and extending between the first and second members, the first and second members movable between an open position, in which at least a part of the first member is spaced from the second member, and a closed position, in which said at least a part of the first member is adjacent the second member; and at least one spacer sized to be located between the first and second members when in the open position, and to maintain the first and second members in the open position, wherein, in the open position, the at least one tension member is held taut between the first and second members.

16 Claims, 14 Drawing Sheets

(56) References Cited

U.S. PATENT DOCUMENTS

| | | | |
|---|---|---|---|
| 6,204,752 B1* | 3/2001 | Kishimoto | 340/432 |
| 7,313,835 B1 | 1/2008 | Hodges | |
| 7,849,866 B1* | 12/2010 | Mangum | 135/96 |
| 8,381,749 B1* | 2/2013 | Ashmore, Jr. | 135/96 |
| 2003/0197122 A1* | 10/2003 | Faiola | A61L 2/28 250/302 |
| 2005/0166433 A1 | 8/2005 | Barlow | |
| 2006/0109658 A1 | 5/2006 | Chou | |
| 2008/0231815 A1 | 9/2008 | Ganzevoort | |
| 2009/0289137 A1* | 11/2009 | Fischer | A47K 10/40 242/170 |
| 2010/0139135 A1 | 6/2010 | Taylor et al. | |

* cited by examiner

Figure 21a  Figure 21b  Figure 21c  Figure 21d
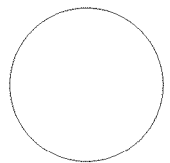 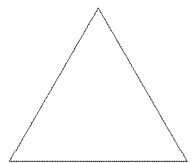 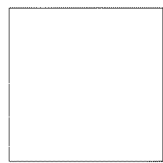 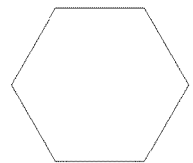
Figure 22a                              Figure 22b
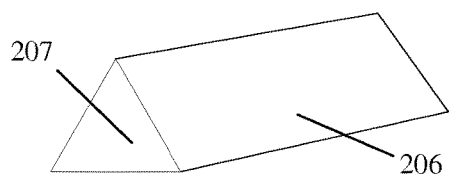 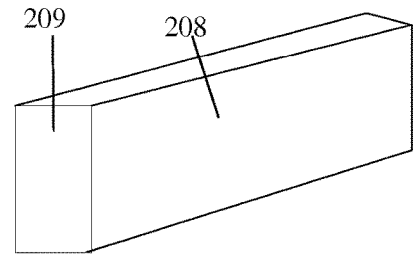
Figure 23
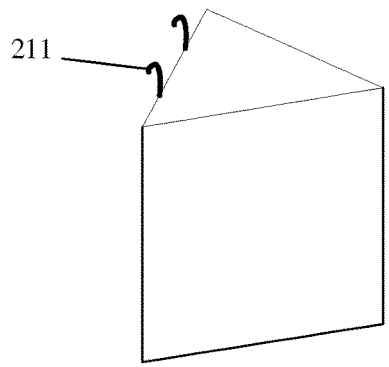

Figure 24a  Figure 24b
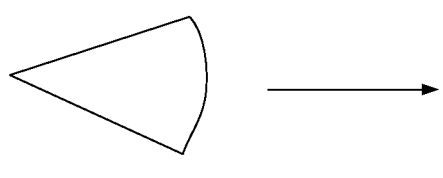 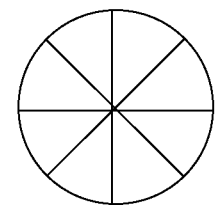
Figure 25a  Figure 25b
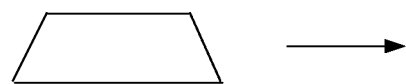 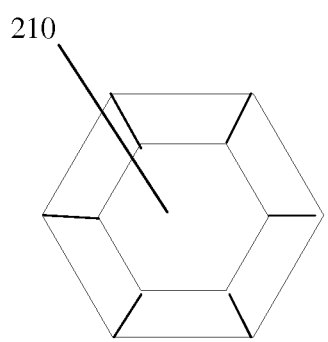

EXPANDING DEVICES

FIELD OF INVENTION

This invention relates to expandable devices that may be used, for example, for display, support and/or storage. However, the devices described herein are not limited to these uses.

BACKGROUND

Conventional collapsible tables and advertising material (e.g. banners etc.) are often difficult to assemble with component parts that are heavy and bulky. Accordingly, there is a desire to have compact lightweight advertising or marketing devices that may be easily transported and erected to provide one or more display surfaces upon which in entity's massage may be displayed. There is also a desire for portable storage or table top devices that can support items and take up little space when not in use.

SUMMARY OF THE INVENTION

In one broad form the invention provides an expandable device including; a first member; a second member; at least one tension member attached to the first and second members and extending between the first and second members, the first and second members movable between an open position in which at least a part of the first member is spaced from the second member and a dosed position in which said at least a part of the first member is adjacent the second member, and at least one spacer sized to be located between the first and second members when in the open position and to maintain the first and second members in the open position, and wherein, in the open position, the at least one tension member is held taut between the first and second members.

In one form, the tautness of the one or more tension members is such to prevent substantial movement of the first and second members relative to each other.

In another broad from, the preset invention provides an expandable device, including: a first member; a second member; a spacer; and a panel attached to and extending between the first and second members; wherein, Said device is expandable from a closed position, in which at least a part of said first member is substantially adjacent said second member, and, an open position, in which said spacer is located between said first and second member, whereby at least a part of said first member is spaced apart from said second member, and said panel is held substantially taut between said first and second members.

In another broad form the present invention provides an expandable device including: a first member; a second member, an extension amending between the first member and the second member, the extension permitting the first member and the second to move with respect to one another between an expended configuration, wherein the first and second member arc separated by a first distance, and a compact configuration, wherein the distance between the first and second members is less than the first distance; and a spacer for maintaining the first and second members in the expanded configuration.

In one form, in the expanded configuration, the extension is substantially completely extended.

In one form the spacer is adjustable in length. Typically this allows the spacer to be inserted between the first and second members, and then extended, pushing the first and second member apart until the at least one tension member/extension/panel is taut. This also allows the spacer to be reduced in length as the device is move into the closed position or compact configuration. The spacer may be removable to allow the compact configuration or simply substantially reducible in length. For example, the spacer may be telescopic.

In one form the at least one tension member/extension/panel member may be a display panel or may include mountings upon which at least one display panel may be mounted. In one form, the device includes a lighting assembly to illuminate the display panel.

In one form, the tension member/extension/panel is typically sheet like and flexible with fabric like properties such that, when in the closed position, and not pulled taut by the spacer, the tension member/extension/panel is flaccid. This permits the device to be easily compacted. For example the tension member/extension/panel may be formed of any suitable material, such as a woven or non-woven fabric, paper, and plastics or the like.

Where one or more tension members/extensions/panels are sheet like, preferably they are "drum tight", in a similar manner to which a drum skin is tensioned to be relatively rigid.

In one farm, the first and/or second member has an aperture through which the spacer member can pass to engage the other member, or otherwise. Where multiple spacer members arc used there may be a corresponding number of apertures. The aperture may be configured so that when the spacer is fully inserted to open the device (i.e. expand the device to the open position), the spacer and member engage each other in a releasable locking arrangement such that the spacer cannot be retracted before being unlocked. Preferably this locking occurs by way of a rotary motion of the spacer about a longitudinal axis. In one form a bayonet type fitting is provided.

In most forms of the invention, in use, one of the members will be a base or bottom member and the other will be a top member, with the device opening or expanding in a generally vertical direction. In some instances, the spacer may protrude form the top member allowing attachment thereto of additional members such as, for example, an umbrella or flag.

It will be appreciated that the device may also open in a generally horizontal direction or any other direction.

In one form, the first and second members are substantially planar, and the extension/tension member/panel extends from the periphery of the first member to the periphery of the second member such that, when in the expanded configuration, the spacer is substantially enclosed within the device. This allows a 360° display surface, visible from all sides.

In a thither broad form the present invention provides a method for expanding an expandable device, the device including: a first member; a second member; a spacer; and a panel attached to and extending between the first and second members; wherein, said device is expandable from a closed position, in which at least a part of said first member is substantially adjacent said second member, and, an open position, in which said spacer is located between said first and second member, whereby at least a part of said first member is spaced apart from said second member, and said panel is held substantially taut between said first and second members, the method including: separating the first and second members; and inserting the spacer between the first and second members.

It will be appreciated that the expanded devices as described herein may be used for many applications including advertising structures, table top surfaces, and storage devices. The devices may also include attachment means for engaging with a support structure (including vehicles) for elevation and/or visibility. The devices are compactable and light weight and thus allow easy transportation.

Unless the context clearly requires otherwise, throughout the 5 description and the claims the words 'comprise', 'comprising', and the like are to be construed in an inclusive sense as opposed to an exclusive or exhaustive sense; that is to say, in the sense of "including, but not limited to". The foregoing features of the invention may be combined in any combination of features where features are not mutually exclusive.

BRIEF DESCRIPTION OF THE DRAWINGS

The present invention will become better understood from the following detailed description of various non-limiting embodiments thereof, described in connection with the accompanying figures, wherein:

FIGS. 21a-21d show top views of a range of shapes suitable for first and second members;

FIGS. 22a-22b show perspective views of embodiments of the expandable device having the shape of a triangular and rectangular prism;

FIG. 23 shows a perspective view of an embodiment including hooks;

FIGS. 24a-24b show, from a top view, how multiple devices may he fitted together, FIGS. 25a-25b shows from a top view, how devices having hexagonal cross section may he fitted together.

DETAILED DESCRIPTION

Figure 1:
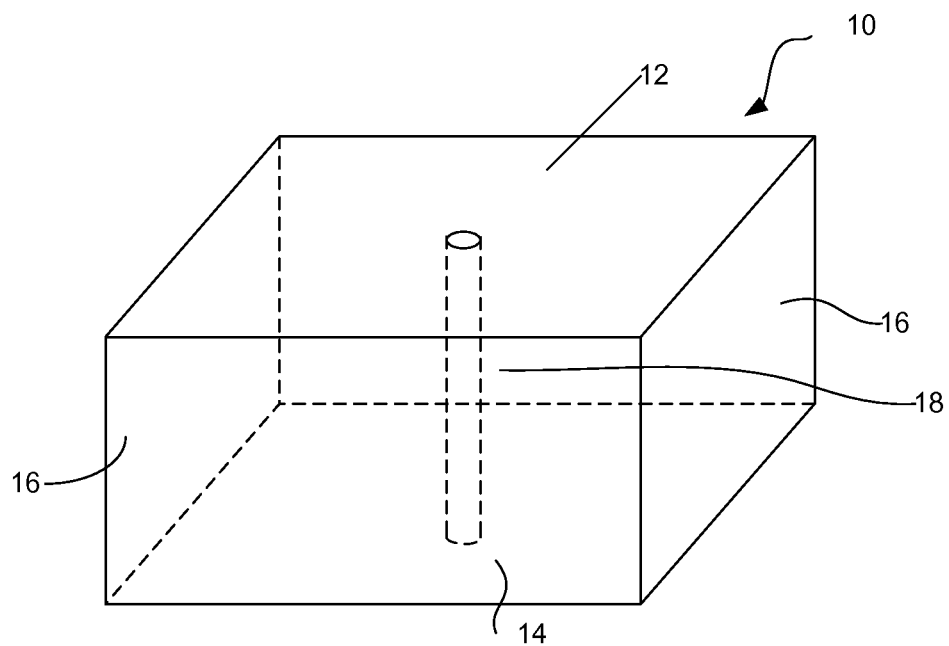
FIG. 1 shows a perspective view o a first embodiment of the invention in an open position.
Figure 2:
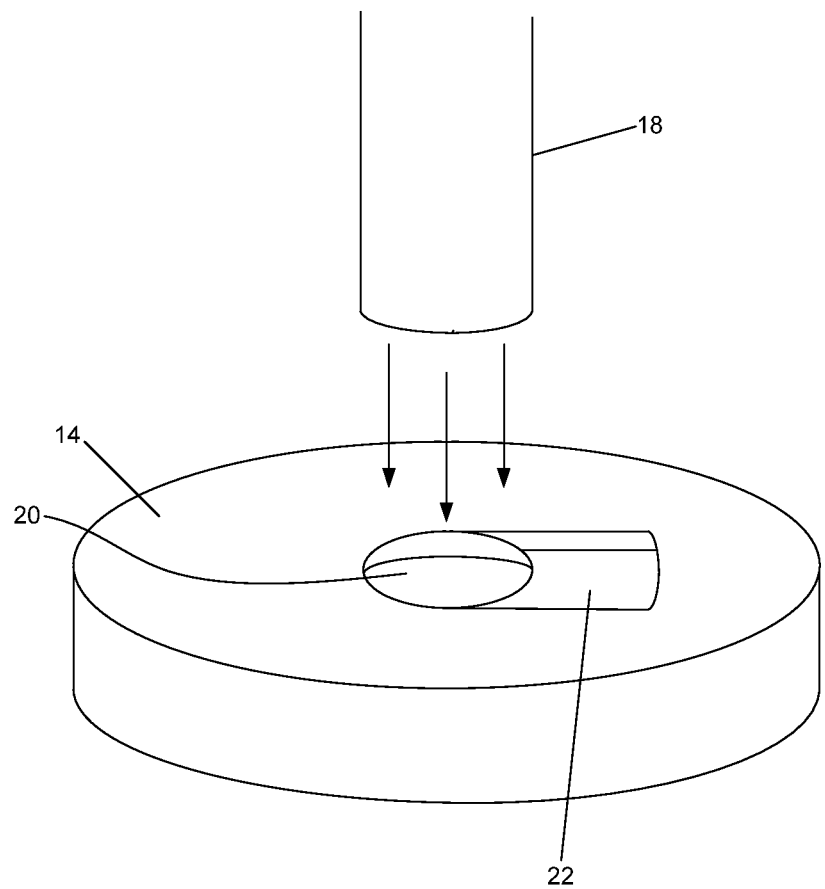
FIG. 2 shows a perspective view of a portion of the first embodiment of the invention.
Figure 3:
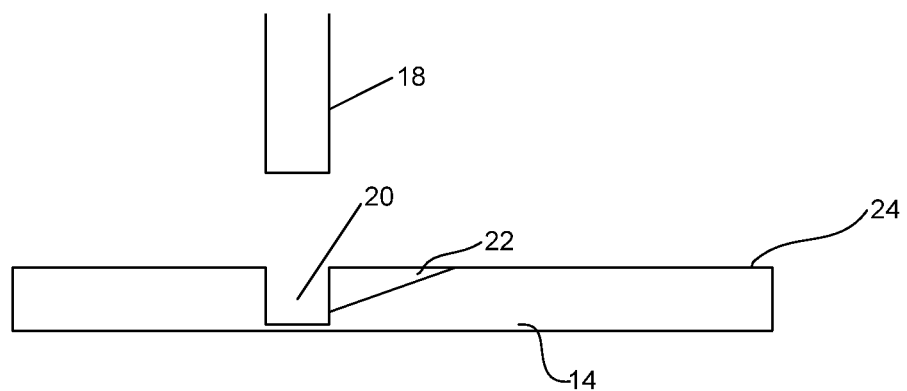
FIG. 3 shows a side view of the portion of FIG. 2.
Figure 4:
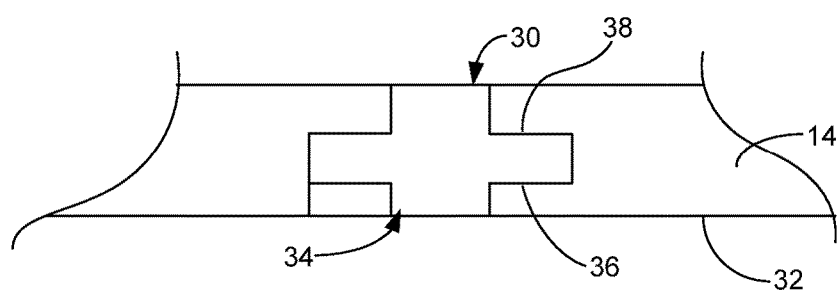
FIG. 4 shows a side view of an alternate fixing arrangement.
Figure 5:
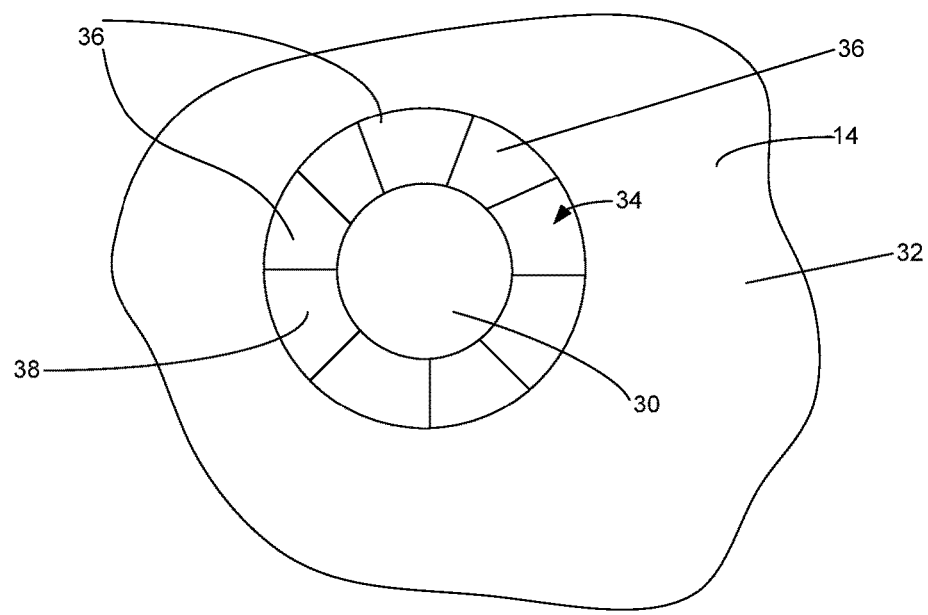
FIG. 5 shows a plan view of the fixing arrangement of FIG. 4.
Figure 6:
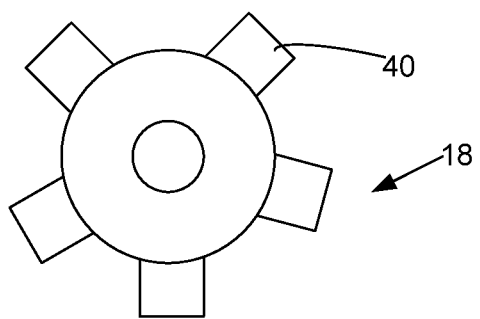
FIG. 6 shows a plan view of a spacer for use with the fixing arrangement of FIGS. 4 and 5.
Figure 7:
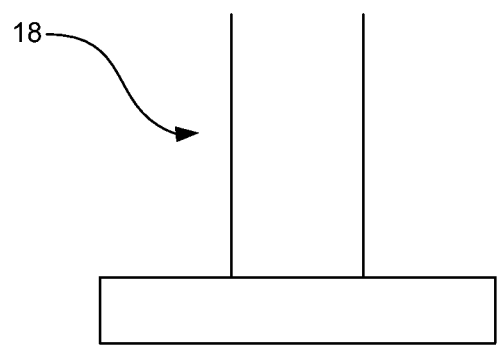
FIG. 7 shows a side view of the spacer of FIG. 6.

One embodiment is illustrated in FIGS. 1 to 3. Shown is an advertising device 10 that Includes a top member 12 and a bottom member 14 and side panels 16.

The top and bottom members 12, 14 are relatively rigid. The side panels 16 arc generally flexible, such as a sheet, and may be formed of any suitable material, such as a woven or non-woven fabric, paper, and plastics or similar. The flexibility of the side panels 16 allows the bottom and top to move between a closed or collapsed position and an open position, as show in FIG. 1. Each side panel 16 is attached to the top and bottom members 12, 14.

A single side panel may be provided that extends around substantially all of the periphery of the top and bottom members or two or more side panels may be provided. For a rectangular shape, as an example, four side panels may be provided, one for each side or the rectangle. For a circular periphery a single panel may be provided.

One or more rigid spacers 18 are provided that in use are located between the bottom and top members 12, 14. In the embodiment shown a single spacer 18 is provided. In the embodiment shown the top and bottom members are rectangular and the single spacer 18 is located at the centre of the rectangle. The spacer 18 engages the top and bottom members 12, 14 and holds them spaced apart such that the side panels 16 are held taut between the top and bottom members. In this configuration the device is relatively rigid and stable.

Application of a downward force on one side of the top member will generate a corresponding tension force in the opposite side panel, resisting the downward movement. The spacer member 18 may be located between the inner surfaces of the top and bottom members, 12, 14. Preferably at least One of the top and bottom members 12, 14 has a locating member with which the spacer engages, so as to locate the spacer at a fixed location. The locating member may be a socket into which the spacer member is received or a protrusion that is received in a socket on the spacer member. Other arrangements may be used for locating the spacer member(s).

Referring to FIGS. 2 and 3 there is shown a portion of a bottom member 14. The bottom member 12 has a recess 20 on its inner or upwards facing surface. The recess 20 is shaped to receive a spacer member 18. In this; embodiment this spacer member 18 is circular in cross section and the recess 20 has a corresponding circular cross section. However, other cross sections arc possible. Adjacent the recess 20 is an angled surface 22 that extends from the general plane of the upper surface 24 of the bottom member 14 downwards to intersect with the recess 20.

The spacer may be inserted into the recess by first engaging the upper surface 24 and sliding it toward recess 20 along angled surface 22, until the end of the spacer 18 passes into the recess. Once within the recess the spacer is generally trapped and will not accidentally come out of the recess 20. The top member may have a similar recess to receive the other end of the spacer member 18.

Other arrangements for locating and seeming the spacer member 18 may be used. The top and bottom members may have a protrusion that is received in the end of the spacer member. Whilst internal fixing of the spacer member is preferred, one of the top and bottom members may have an aperture through which the spacer member passes with a rotary locking arrangement.

FIGS. 4 to 7 shows a bottom member 14 having an opening 30. The lower surface 32 has a recess 34 surrounding the opening and a series of radially inward extending arms 36 spaced from the base 38 of the recess. The spacer member 18 has corresponding radially outward extending arms 40 sized to fit between the arms 36. Rotation of the spacer member 18 causes the arms 40 to be trapped between the base 38 of the recess and the inward extending arms 36, thus preventing retraction until rotated out of alignment.

Figure 8:
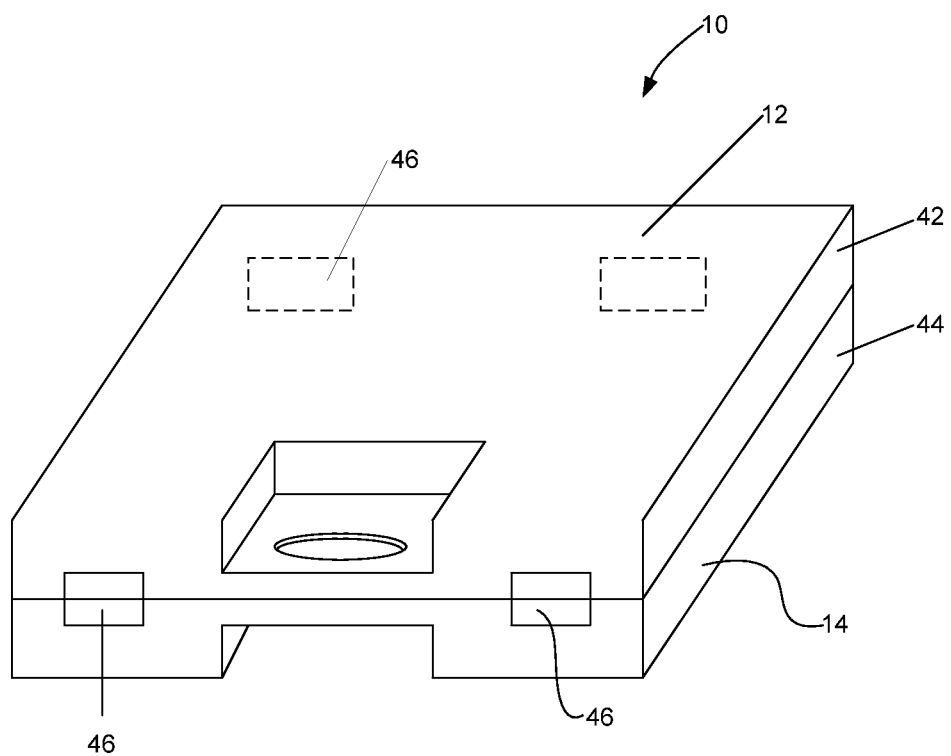
FIG. 8 shows a perspective view of the device of FIG. 1 in a closed position.

In one embodiment, as shown in FIG. 8 the device is similar to a clam shell suitcase or briefcase and the bottom and top members are tub shaped with peripheral side walls 42 and 44 respectively. Rather than a hinge or zipper securing the bottom and top members together clips 46 may be used. To expand the device the clips 46 are undone and the spacer members inserted between the bottom and top members to secure them apart.

Figure 9:
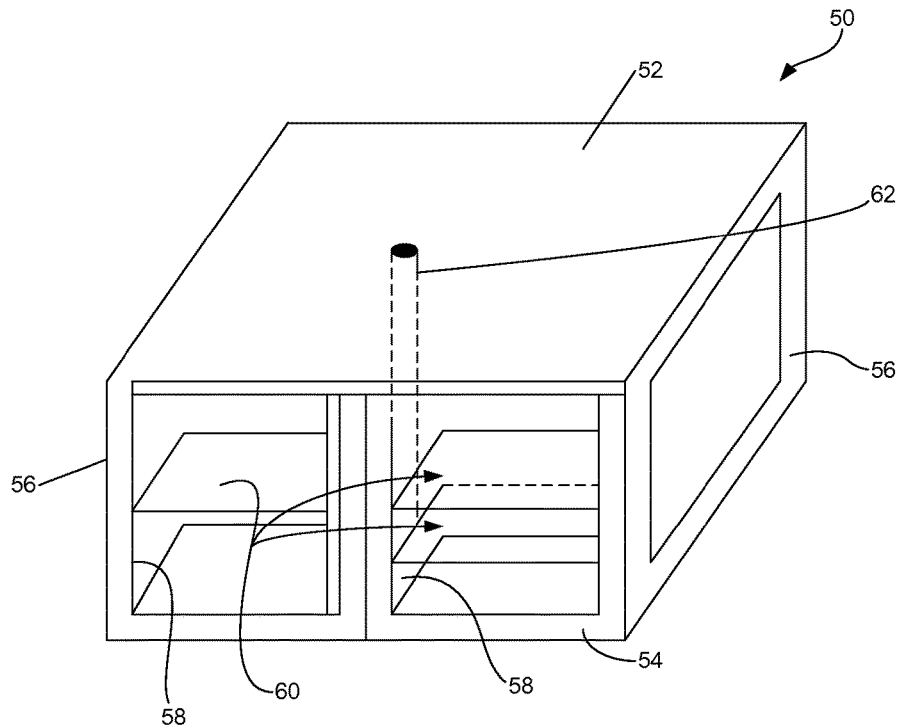
FIG. 9 shows a perspective view of a second embodiment of the invention in an open position.

Referring to FIG. 9 there is shown a display device 50 according to one embodiment of the invention. The display device 50 has lop and bottom members 52 and 54 that may be held apart by spacer 62 as previously described. Display panels 56 extend between the ends of top and bottom members 52, 54. Shelves 60 extend between end panels 56 and central wall or walls 58, that also extends between top and bottom members. When raised, as shown in FIG. 9, the vertical walls 56 and 58 are held taut and the shelves 60 may carry relatively lightweight items, such as leaflets and brochures.

Figure 10:
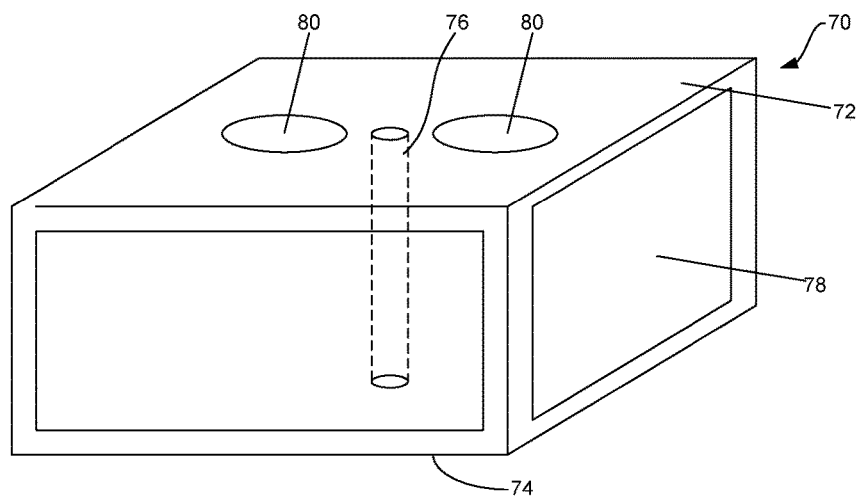
FIG. 10 shows a perspective view or a third embodiment of the invention in an open position.

FIG. 10 shows a device 70 according to a further embodiment of the invention, comprising top and bottom members 72, 74. These arc as per the previous embodiments and held in an open position by one or snore spacer members 76. Side panels 78 extend between the top and 5 bottom members land are held taut when in the open position. The top member 72 is provided with one or more apertures 80. These apertures 80 may be used to receive circular items such as a bin or a flower pot. The device could also be used as a portable kitchen sink, by placing a bowl or bucket in an aperture for use as a washing up bowl.

Figure 11:
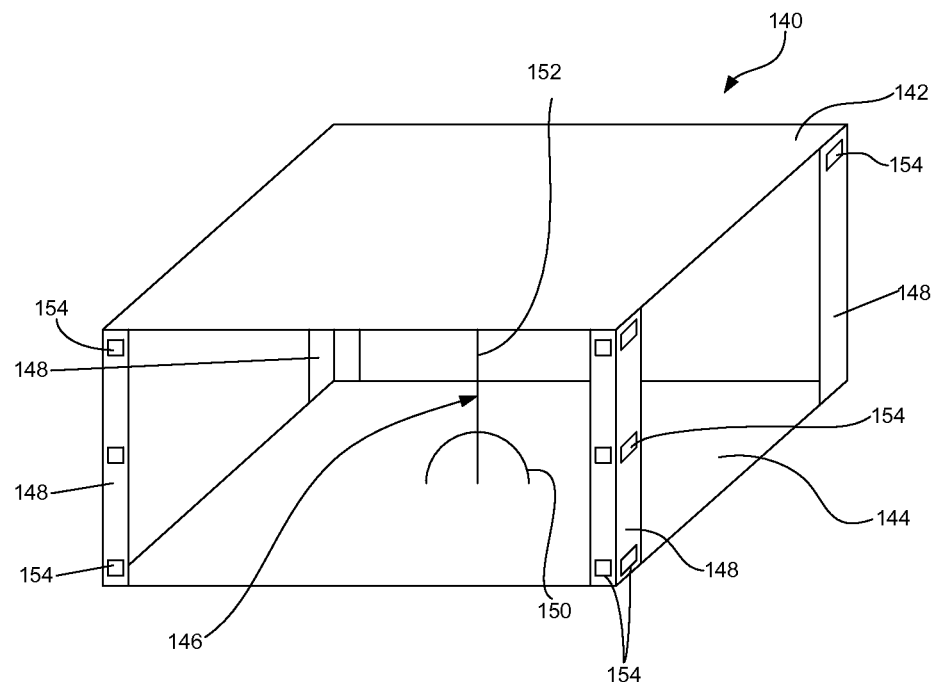
FIG. 11 shows a perspective view of a fourth embodiment of 5 the invention in an open position.

FIG. 11 shows an expandable device 140 having top and bottom members 142 and 144, respectively. The top and bottom members 142, 144 are held apart by spacer 146. If desired the spacer member 146 may have a single shaft or rod 152 with multiple feet 150 at either or both ends. The figure is schematic and the feet 150 can be spaced further apart or closer together compared to what is shown in the drawing.

Extending between the top and bottom members 42, 144 are tension members 148. When expanded the tension members 148 are taut and, as with the other embodiments, generate stiffness in the structure. In this embodiment the tension members are located at the corners of the top and bottom members 142, 144 but need not be. In this embodiment each tension member extends around the corner and along the two sides adjacent a corner but this is not essential. A single tension member may extend along only one side. Two tension members may be located at each corner, with each extending along a single side. The tension members may be located away, from the corners. Storage members, such as those shown in FIG. 9, may be secured to the tension members and the top and/or bottom members. One or more apertures may be provided in the top member 142, as in FIG. 10.

The tension members 148 may be provided with mountings 154 whereby display material or panels may be attached to the tension members. The mountings 154 may be any suitable structure, such as clips that bold such material or hook or loop fastener material that engages complimentary materials located on the display material.

Whilst the embodiments shown and described have generally planar top and bottom members that are generally parallel, neither the planar nature of the top and bottom members nor their parallelism is essential to the invention. The embodiments described may be made relatively tall and may be used as a portable lectern, desk or table top. Thus, as an example, the embodiment of FIG. 11 could be made about 1 to 1.5 meters tall with the top member being generally planar but angled relative to the bottom member, so as to provide an angled surface upon which lecture, or speech notes or similar may be placed. Suitable sides may be attached to the tension members. These may be blank or may have advertising/promotional messages relating to the user of the lectern.

Figure 14A:
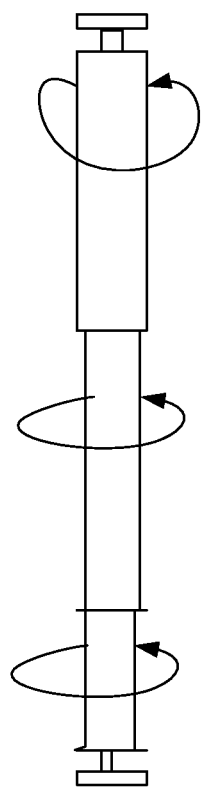
FIGS. 14a-14c show alternate spacer embodiments.
Figure 14B:
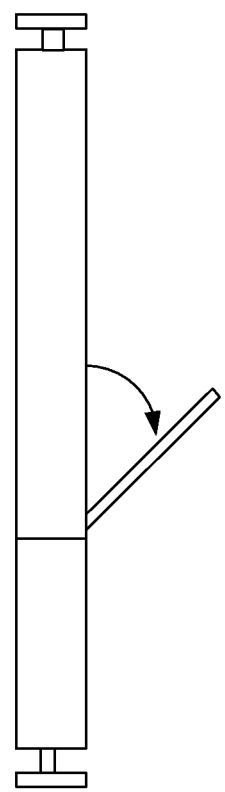
Figure 14C:
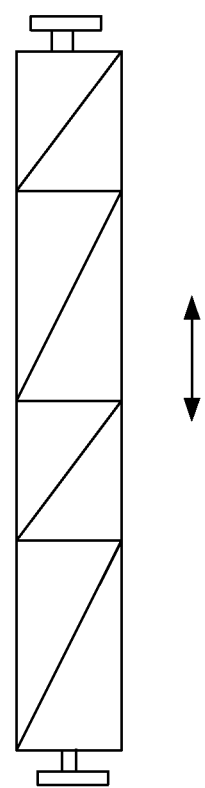

As described the spacer member may be one or more rods. The rods may be of fixed length or may be adjustable in length. For example, as shown in FIGS. 14a-14c, the rods may be formed or two or more lengths joined together in a manner to enable the overall length to be adjusted. The two or more lengths may be joined together so as to move axially relative to each other (as indicated by the action arrow in FIG. 14c). This may be by a simple sliding action or may be by a screw action (FIG. 14a), with complementary screw threads on engaged lengths. Where a simple sliding action is used, preferably there is a mechanism, such as a lever (FIG. 14b) or worm gear, or similar, to enable the length of the spacer member to be expanded against the tension in the tension member(s) and retained in the extended length against the tension of the tension member(s).

Figure 16:
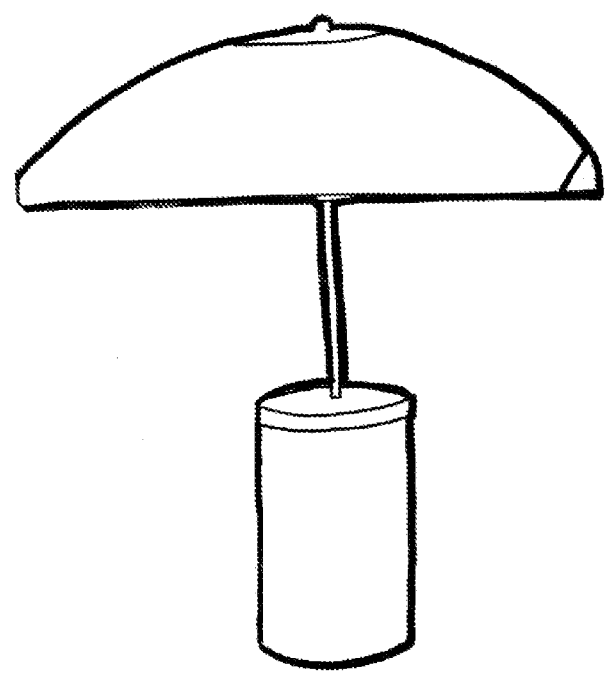
FIG. 16 shows a perspective view of, an example of an embodiment of the device with attached umbrella.
Figure 17:
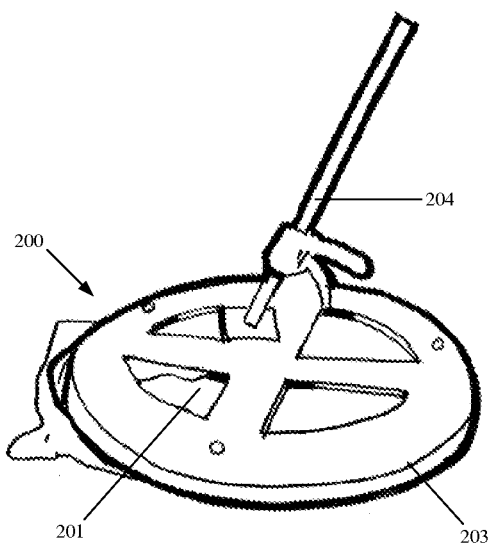
FIG. 17 shows a perspective view of an embodiment of an expanding device in the collapsed position.
Figure 18:
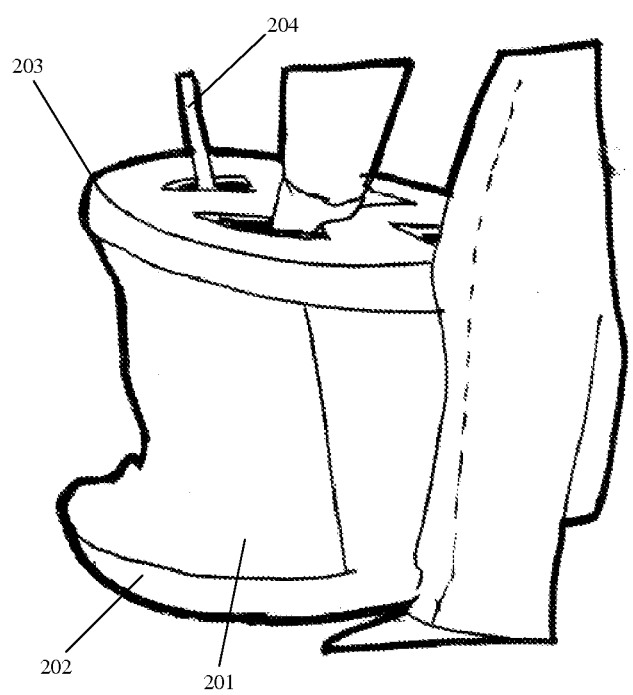
FIG. 18 shows a perspective view of the embodiment of FIG. 17 in a partially expanded position.
Figure 19:
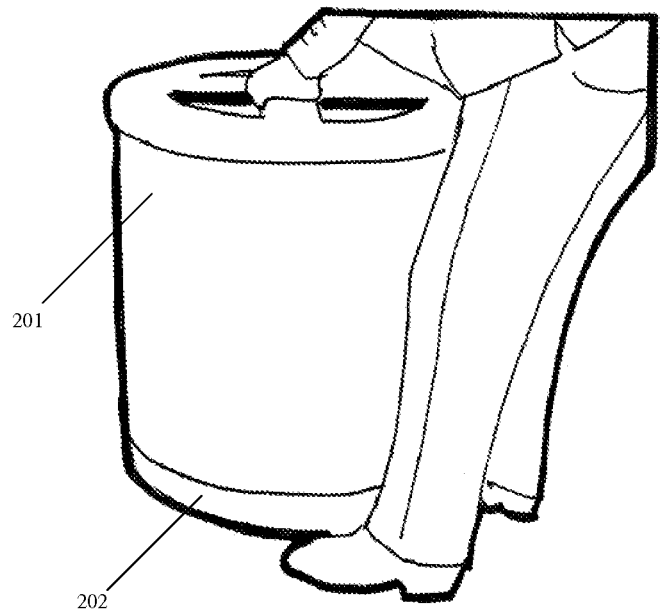
FIG. 19 shows a perspective view of the embodiment of FIG. 17 expanded sufficiently to receive the spacer.
Figure 20:
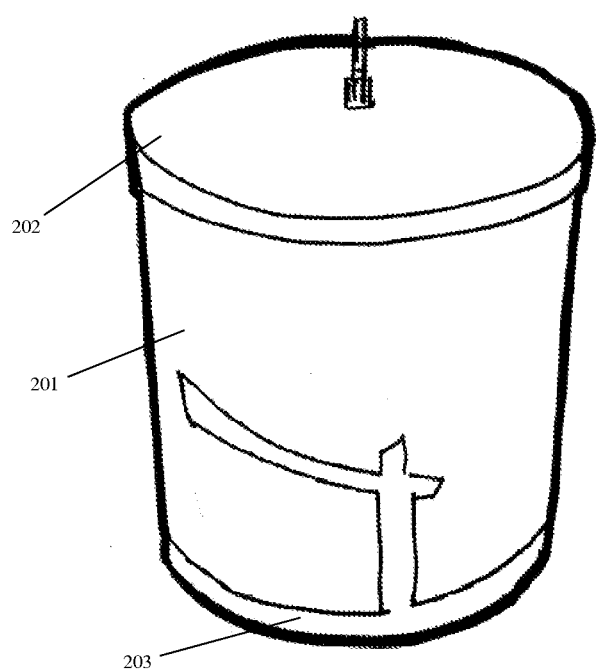
FIG. 20 shows a perspective view of the device of FIG. 17 in the expanded configuration, or open position.

FIGS. 17 to 20 illustrate a typical process for expanding and/or collapsing devices as described herein. FIG. 16 shows a typical device (200) in accordance with the invention in the collapsed position. The display panel (201) is collapsed in and folded between top (202) and bottom (203) members of the device (200). As shown in FIG. 18, to begin assembling the device the bottom member (203) is lifted away from the top member (20) to provide a space there between. Once the separation between top and bottom members is sufficient to receive the spacer (204), the spacer is positioned therein. Although not shown in the figure it will be appreciated that the top and/or bottom members may have an engagement portion to receive and engage the spacer (204) securely and/or centrally. Once the spacer (204) is in position it is expanded such that the display panel extending between the top and bottom portion is pulled taut. In this particular example, top and bottom members are substantially disc shaped, and the display panel extends from the periphery of the first member to the periphery of the second member such that, when in the open position, the device is substantially cylindrical in appearance.

Figure 15:
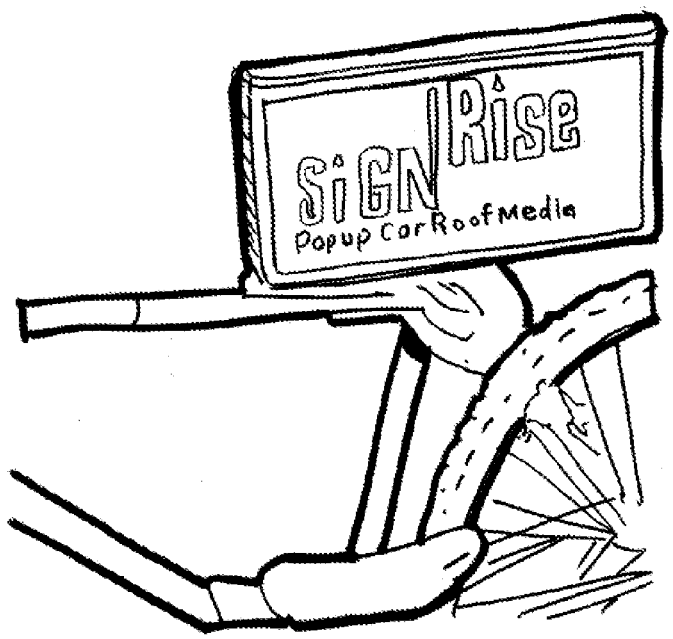
FIG. 15 shows perspective view of an embodiment of the expanding device mounted on a bicycle seat stem.

Furthermore, the embodiments of the invention may be configured to be mountable on a support, such as, for example, a support stand or vehicle. In one particular example (as shown in FIG. 15) the bottom member may include a recess configured to receive and engage the seat stem of a bicycle frame such that the device can be mounted on the frame of a bicycle once the seat is removed.

Figure 12:
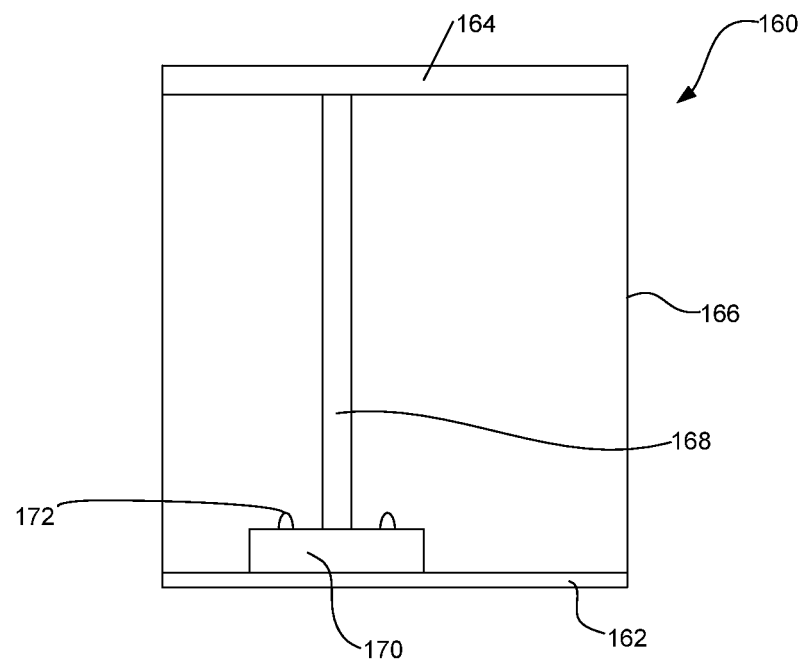
FIG. 12 shows a side view of an embodiment of the invention including a lighting assembly.
Figure 13:
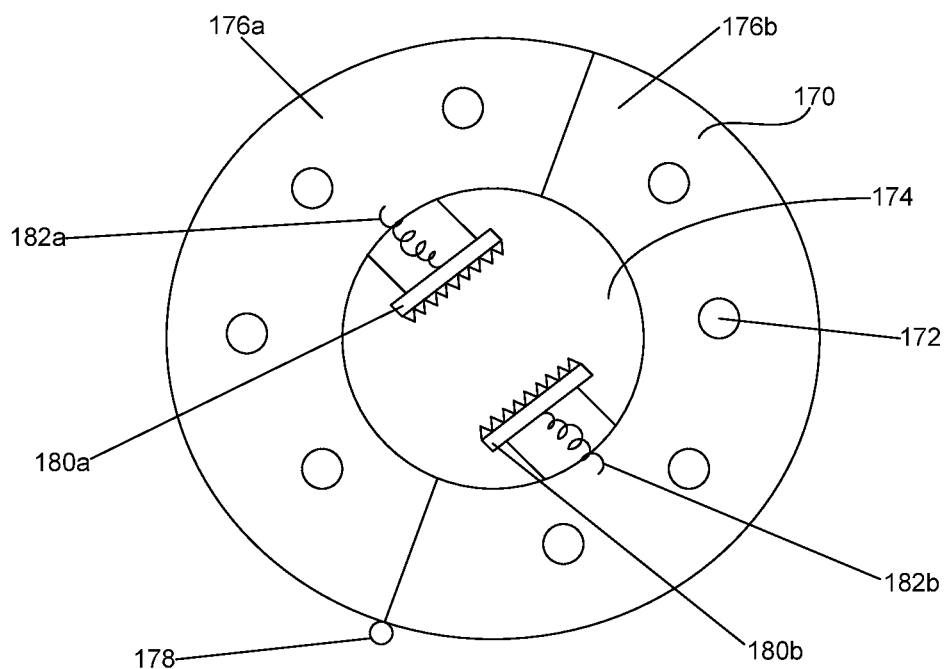
FIG. 13 shows a plan view of the lighting assembly of FIG. 13.

The embodiments of the invention may be provided with one or more internal lights. These are preferably located on the spacer member(s). FIGS. 12 and 13 show a device 160 with a top and bottom members 164, 162 with a spacer member 168 extending between the members to hold tension member 166 drum tight. A circular lighting assembly 170 is secured on the spacer member 168 and has light sources 172, such as LED lights, to illuminate at least the interior of the device. The lighting assembly 170 has an aperture 174 through which the spacer member 168 extends. The lighting assembly 170 may be formed of two parts 176*a* and 176*b* joined at hinge 178. Each part, 176*a*, 176*b* is preferably provided with grip members 180*a*, 180*b* for gripping a spacer member passing through the aperture 174. These grip members 180*a*, 180*b* may be biased radially inwards, as indicated schematically by springs 182*a*, 182*b*. The lighting assembly 170 may be attached to the spacer at any point along its length and so may be located next to the top member 164 or at a point between the top and bottom members. The lighting 5 assembly 170 may have lights on any of its surfaces, including any or all of its upper, lower and peripheral surfaces.

It will be appreciated that the first and second members may be any shape, such as, for example a circle, oval, triangle or other polygon (see FIGS. 21*a* to 21*d*). Accordingly, the expandable device may take on a range of shapes when in the open or expanded form. For example the expanded or open form may be a cylinder, triangular, hexagonal or rectangular prism etc. In one particular example, the device when expanded resembles a rugby ball.

It will also be appreciated that the device can be expanded in a substantially horizontal direction (or simply oriented horizontally once expanded) such that the first and second members form supporting end members. One such example is show in FIGS. 22*a* and 22*b* which show (a) a display panel (206) being pulled taut between two triangular end members (207) to form a triangular prism (FIG. 22*a*) (b) a display panel (208) being pulled taut between two rectangular end members (209) to form a rectangular prism (FIG. 22*b*). These embodiments are particularly suited for displaying advertising material on sporting pitches or the like. Further as the devices may be internally lit, they would be particularly suitable for night games or other night time entertainment.

As shown in FIG. 23, the first and/or second member may include attachment means, such as hooks (211), to permit suspension or hanging of the expandable device from a structure such as, for example, a fence or ceiling.

As shown in FIGS. 24*a* and 24*b* and FIGS 25*a* and 25*b*, it will also be appreciated that multiple expandable devices as described herein may be interconnected, linked or adapted to fit together. FIG. 24*a* shows a top view of first and second members shaped as triangles with rounded bottoms. Once expanded, the devices may be vertically oriented and fitted together to form a cylindrical shape (see FIG. 24*b*). This embodiment may have application in a situation wherein employees of a company each have their own personal marketing material (expandable devices) and, when coming together at a conference or the like, they can link their personal devices together to from neat structure.

Another example is illustrated by FIGS. 25*a* and 25*b* which shows expandable devices as described herein shaped as hexagonal prisms (top view seen). When vertically oriented and fitted together they form a structure having a vacancy (210) in the centre (see FIG. 25*b*). Accordingly the structure provided may house items or a person, such that it can be used as a kiosk. In one example, sonic of the prisms may be of a substantially shorter length such that a counter is formed for the kiosk.

The features of the embodiments of the invention may be combined in any combination of features where features are not mutually exclusive. It will be apparent to those skilled in the art that many obvious modifications and variations may be made to the embodiments described herein without departing from the spirit or scope of the invention.

The claims defining the invention are as follows:

1. An advertising assembly movable between an expanded configuration and a collapsed configuration, the advertising assembly including:
   a first substantially planar end member;
   a second substantially planar end member;
   at least one display panel attached to and extending between an outer periphery of the first end member and an outer periphery of the second end member; and
   a spacer positionable such that at least part thereof extends between opposing sides of the first and second end members to maintain the assembly in the expanded configuration, the end members configured to receive or engage the spacer centrally, the spacer including a first rod and a second rod joined together so as to move axially relative to one another to adjust a length of the spacer, wherein the first rod and the second rod have complementary screw threads adapted to expand the length of the spacer against tension of the at least one display panel and to retain the spacer in the expanded length against the tension of the at least one display panel,
   wherein, in the expanded configuration, the spacer engages the first and second end members and holds the first and second end members spaced apart such that the at least one display panel is held drum-tight taut between the first and second end members, and, at least part of the spacer is located within an enclosure at least partly defined by the first end member, the second end member and the at least one taut display panel.

2. The assembly as claimed in claim 1, wherein, in the expanded configuration, the tautness of the at least one display panel is such to prevent substantial movement of the first end member relative to the second end member.

3. The assembly as claimed in claim 1, wherein the spacer is adjustable in length.

4. The assembly as claimed in claim 1, wherein the spacer is a telescopic rod.

5. The assembly as claimed in claim 1, wherein the assembly is adapted to be mounted to a seat stem of a bicycle frame.

6. The assembly as claimed in claim 1, wherein the first and second end members are substantially disc shaped.

7. The assembly as claimed in claim 6, wherein, in the expanded position, the assembly is substantially cylindrical.

8. The assembly as claimed in claim 1, wherein the first and/or second end member includes an aperture for receiving the spacer therethrough such that at least part thereof can be positioned to extend between the first and second end members.

9. The assembly as claimed in claim 1, wherein the at least one display panel is at least one fabric sheet.

10. The assembly as claimed in claim 1, wherein, in the collapsed configuration, the at least one display panel is not taut.

11. The assembly as claimed in claim 1, further including a light source within the enclosure to transilluminate the at least one display panel.

12. The assembly as claimed in claim 1, wherein the at least one display panel is substantially tubular.

13. An advertising assembly movable between an expanded configuration and a collapsed configuration, the assembly including:

a first end member;

a second end member;

at least one display panel attached to and extending between the first end member and the second end member; and a spacer positionable such that at least part thereof extends between opposing sides of the first and second end members to maintain the assembly in the expanded configuration, the first and second end members being configured to receive or engage the spacer centrally, the spacer including a first rod and a second rod joined together so as to move axially relative to one another to adjust a length of the spacer, wherein the first rod and the second rod have complementary screw threads adapted to expand the length of the spacer against tension of the at least one display panel and to retain the spacer in the expanded length against the tension of the at least one display panel, wherein, in the expanded configuration, the spacer engages the first and second end members and holds the first and second end members spaced apart such that the at least one display panel is held drum-tight taut between the first and second end members, and wherein, in the expanded configuration, the first end member, the second end member and the at least one taut display panel at least partly define the boundaries of an internal space, and at least part of the spacer is positioned within the internal space.

14. An advertising assembly movable between an expanded configuration and a collapsed configuration, the assembly including:

a first end member;

a second end member;

at least one display panel releasably attachable to the first and second end members; and a spacer positionable such that at least part thereof extends between opposing sides of the first and second end members to maintain the assembly in the expanded configuration, the first and second end members being configured to receive or engage the space centrally, the spacer including a first rod and a second rod joined together so as to move axially relative to one another to adjust a length of the spacer, wherein the first rod and the second rod have complementary screw threads adapted to expand the length of the spacer against tension of the at least one display panel and to retain the spacer in the expanded length against the tension of the at least one display panel, wherein, in the expanded configuration, the at least one display panel is attached to the first and second end members and the spacer engages the first and second end members and holds the first and second end members spaced apart such that is held drum-tight taut between the first and second end members, and wherein, in the expanded configuration, the first end member, the second end member and the at least one taut display panel at least partly define the boundaries of an internal space, and at least part of the spacer is positioned within the internal space.

15. An advertising assembly movable between a deployed configuration and a collapsed configuration, the assembly including:

a first end member;

a second end member;

at least one display panel attached to and extending between an outer perimeter of the first end member and an outer perimeter of the second end member; and at least one removable spacer positionable such that at least part thereof extends between the first end member and the second end member to place the assembly in the deployed configuration, the end members being configured to receive or engage the at least one spacer at one or more positions such that, in the deployed configuration, the at least one display panel is held drum-tight taut between the first and second end members and the tautness is such to prevent substantial movement of the first end member relative to the second end member, the spacer including a first rod and a second rod joined together so as to move axially relative to one another to adjust a length of the spacer, wherein the first rod and the second rod have complementary screw threads adapted to expand the length of the spacer against tension of the at least one display panel and to retain the spacer in the expanded length against the tension of the at least one display panel, wherein, in the deployed configuration, the at least one removable spacer is located within an enclosure at least party defined by the first end member, the second end member, and the at least one display panel.

16. The assembly as claimed in claim 15, wherein in the collapsed configuration, the first and second end members form a container and, in the expanded configuration, the assembly provides a shelf at least partly formed by the first end member, the second end member and the at least one display panel.

* * * * *